US007583451B2

(12) United States Patent
Casenave

(10) Patent No.: US 7,583,451 B2
(45) Date of Patent: Sep. 1, 2009

(54) LENS FOR AN OPTICAL MODULE OF A LIGHTING APPARATUS FOR A MOTOR VEHICLE

(75) Inventor: Sébastien Casenave, Bobigny (FR)

(73) Assignee: Valeo Vision, Cedex, Bobigny (FR)

( * ) Notice: Subject to any disclaimer, the term of this patent is extended or adjusted under 35 U.S.C. 154(b) by 153 days.

(21) Appl. No.: 11/385,327

(22) Filed: Mar. 20, 2006

(65) Prior Publication Data

US 2006/0215271 A1 Sep. 28, 2006

(30) Foreign Application Priority Data

Mar. 22, 2005 (FR) .................................. 05 02845

(51) Int. Cl.
*G02B 3/08* (2006.01)
*B60Q 1/04* (2006.01)

(52) U.S. Cl. ......................... 359/741; 359/796; 315/82; 362/507

(58) Field of Classification Search ................. 359/741, 359/793–800, 718, 652–654; 315/82–83; 362/507, 509
See application file for complete search history.

(56) References Cited

U.S. PATENT DOCUMENTS

| | | | | |
|---|---|---|---|---|
| 3,255,451 | A * | 6/1966 | Wolcott | 343/753 |
| 3,511,558 | A * | 5/1970 | Uberhagen | 359/795 |
| 4,414,694 | A * | 11/1983 | Choyce | 623/6.56 |
| 4,730,905 | A * | 3/1988 | Takada | 359/645 |
| 4,956,000 | A * | 9/1990 | Reeber et al. | 65/17.3 |
| 5,200,858 | A * | 4/1993 | Hagerty et al. | 359/652 |
| 5,384,659 | A * | 1/1995 | Shikama et al. | 359/719 |
| 5,548,353 | A * | 8/1996 | Kassner | 351/168 |
| 5,703,722 | A * | 12/1997 | Blankenbecler | 359/653 |
| 5,706,140 | A * | 1/1998 | Nishino et al. | 359/793 |
| 6,571,482 | B1 * | 6/2003 | Tymianski | 33/265 |
| 6,586,864 | B2 * | 7/2003 | Zhou et al. | 313/113 |
| 6,950,245 | B2 * | 9/2005 | Nishioka et al. | 359/721 |
| 7,224,539 | B2 * | 5/2007 | Schaack | 359/741 |
| 2004/0184280 | A1 * | 9/2004 | Ishida et al. | 362/507 |
| 2005/0134164 | A1 * | 6/2005 | Auerbach et al. | 313/474 |
| 2005/0176923 | A1 * | 8/2005 | El-Hibri | 528/373 |
| 2006/0157726 | A1 * | 7/2006 | Loh et al. | 257/100 |
| 2007/0279911 | A1 * | 12/2007 | Kittelmann et al. | 362/328 |

FOREIGN PATENT DOCUMENTS

| | | |
|---|---|---|
| EP | 1 197 387 | 4/2002 |
| EP | 1 344 975 | 9/2003 |
| EP | 1 422 472 | 5/2004 |

(Continued)

OTHER PUBLICATIONS

Search Report for corresponding French Application 05 02 845, filed Mar. 22, 2005.

(Continued)

*Primary Examiner*—Jordan M. Schwartz
(74) *Attorney, Agent, or Firm*—Locke Lord Bissell & Liddell

(57) ABSTRACT

The invention provides a lens for an optical module adapted to be mounted in a lighting apparatus for a motor vehicle. The lens comprises two distinct materials associated with each other and having different refractive indices.

16 Claims, 2 Drawing Sheets

FOREIGN PATENT DOCUMENTS

| | | |
|---|---|---|
| EP | 1 462 829 | 9/2004 |
| EP | 1 464 890 | 10/2004 |
| FR | 2 788 585 | 7/2000 |
| FR | 2 796 130 | 10/2001 |
| FR | 2 815 425 | 4/2002 |

OTHER PUBLICATIONS

Dialog English language abstract for EP 1 344 975, Sep. 17, 2003.
Dialog English language abstract for EP 1 462 829, Sep. 29, 2004.
Dialog English language abstract for FR 2 796 130, Oct. 12, 2001.
Dialog English language abstract for EP 1 464 980, Oct. 6, 2004.
Dialog English language abstract for FR 2 815 425, Apr. 19, 2002.
Dialog English language abstract for FR 2 788 585, Jul. 21, 2000.
Dialog English language abstract for EP 1 422 472, May 26, 2004.
Dialog English language abstract for EP 1 197 387, Apr. 17, 2002.

* cited by examiner

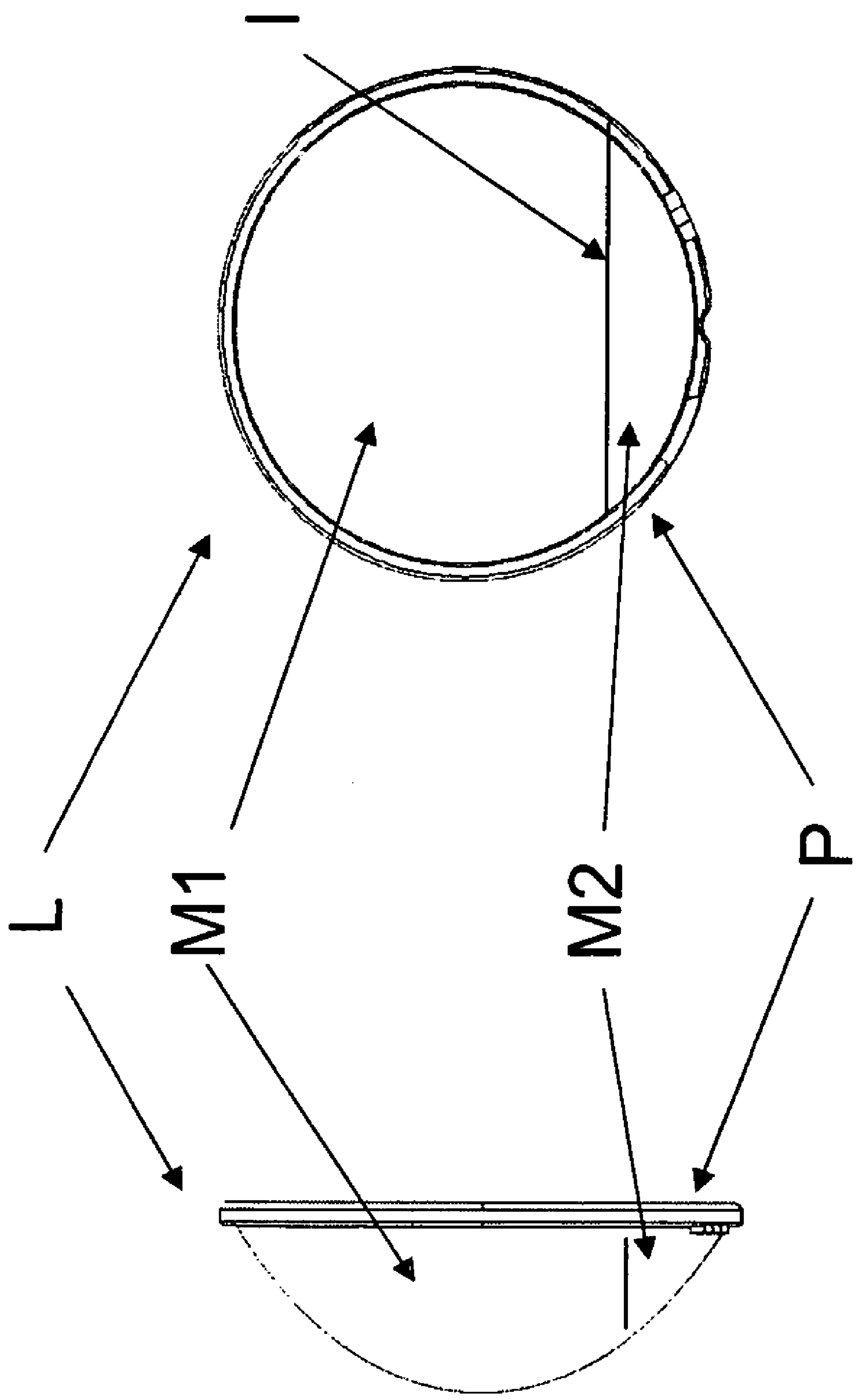
FIGURE 1.b
FIGURE 1.a

LENS FOR AN OPTICAL MODULE OF A LIGHTING APPARATUS FOR A MOTOR VEHICLE

FIELD OF THE INVENTION

This invention relates to lighting and/or indicating apparatus for a motor vehicle, and more particularly to a headlamp.

The invention is particularly relevant to optical modules which are integrated into headlamps in order to produce light beams which satisfy current regulations. More particularly, it is relevant to optical modules of the so-called elliptical type. These modules include at least one light source (consisting of a halogen lamp or xenon lamp for example), which is disposed at the base of a reflector, together with a lens which is arranged in front of the reflector. The lens generally has a round perimeter, and a convex exit face, the reflector being of an elliptical type.

This type of module can serve to produce various types of beam, among which may be mentioned in particular the following:

- beams with no cut-off, for example long range or cruising beams;
- beams with a cut-off, such as low or passing beams (the cut-off is V-shaped with a 15° angle under European regulations, or is inclined slightly differently under American regulations), the purpose of this light distribution being to prevent dazzling of the driver of a vehicle coming in the opposite direction at night;
- any other type of cut-off beam, such as fog lamp beams with a flat cut-off, or beams which are low beams but which are adapted to give some so-called overhead light: the purpose of this is to transmit some light above the cut-off line in order to illuminate road signs with a weak light intensity; and
- beams which are adapted for an indicating or signalling function in addition to the lighting function, for example day running lights (DRL) or a position indicating function such as tail lights.

BACKGROUND OF THE INVENTION

In order to obtain cut-off beams with optical modules having a lens, of the elliptical module type, shields can be inserted into the module in front of the lens in the path of light rays coming from the light source. The shield, which is of an appropriate form, may be fixed: the module is then a single-function module. It may also be movable, so that the module is then a two-function or multi-function module, and so that there can be obtained, with a single module, a beam of the low beam type (with the shield in a working position intercepting some of the light rays), and a beam of the cruising type (with the shield put into an inactive position), or, in an example of a triple function, a cruising type beam (with the shield in an inactive position), a low beam for left-hand drive (with the shield in an active position 1), and a low beam for right-hand drive (with the shield in an active position 2). Numerous patents describe this type of module, both single function and multi-function, for example patents EP1197387 and EP1422472.

In order to obtain cut-off beams, while at the same time giving overhead light with this type of optical module with a lens, a first solution was proposed in the patent EP 1 464 890. It disclosed the use of a shield which was adapted to effect ad hoc cut-off, and a lens provided with peripheral arrangements which are capable of deflecting upwards the light rays that reach them in such a way that enough light reaches the overhead points concerned. In this connection, these overhead target points are normally in a high zone of vision where the light coming from the optical module is occulted by the shield. The said arrangements are for example in the form of ribs located on the lower periphery of the lens. That solution is quite effective from the optical point of view, because the ribs in the lower part effectively enable a little light to be deflected upwards, and above the cut-off line, towards the road signs without significantly disturbing the photometry and distribution of the main cut-off beam. However, the said arrangements may be seen as a disadvantage from the styling point of view, because they remain visible even though they are located at the periphery of the lens.

The invention therefore has the object of providing a new type of lens which enables a beam to be obtained having a particular photometry, and being in particular of the cut-off type with overhead lighting, with optical modules of the elliptical type having a lens which can overcome the above disadvantage. In particular, an object of the invention is to obtain a lens which performs at least as well from the optical point of view, but which has an appearance, once it is fitted in the module, that is as close as possible to that of a standard lens.

SUMMARY OF THE INVENTION

According to the invention in a first aspect, there is provided a lens for an optical module which is adapted to be mounted in a lighting apparatus for a motor vehicle and which comprises two distinct associated materials with different refractive indices. In the whole of the present text, the term lens is used to mean any dioptric element. The element exploits the fact that it is possible to modify the path of the light rays passing through the lens, not by modifying the geometry of the lens but by locally modifying its refractive index. In this way the light beam distribution passing through the lens is able to be modified by adjustment of the zone of the lens that has a different refractive index (in particular by adjusting the dimensions, profile and configuration of the said zone in an appropriate way), and by adjusting the quantity of rays reaching that zone, these rays being rays which will then be deflected by their passage in the lens in a different way from the rays passing through the rest of the lens.

The importance of this modified lens can therefore be seen: it is possible to choose a lens which is commonly used in optical modules for motor vehicle headlamps, in such a way that it performs its function as provided for in an elliptical module, in particular to produce a beam of the cut-off type in association with a shield. However, the lens incorporates a further material which is substituted for the previous material locally, and which, because it has a higher refractive index, will deflect the rays more severely. Preferably, by locating this other material in the lower part of the lens once the latter has been positioned in an optical module under working conditions, it is then possible to deflect some of the rays so that they are able to reach zones in the upper part, above the cut-off line, and in particular the so-called overhead light zones. Because the object is to provide weak lighting, it is enough to proportion in an appropriate way the part of the material having a higher refractive index in the lens so that enough light will reach the overhead lighting targets without significantly disturbing the photometry of the light rays coming from the rest of the lens.

Preferably, the lens according to the invention comprises a predominant first material having at least one insert made of a second material the refractive index of which is different from that of the first material, and in particular greater than that of the first material. In this way the greater part of the material of the lens remains as before, being preferably the material commonly used for this type of application, glass in particular, which enables known moulding techniques to be retained.

The term "material", in the sense of this invention is to be understood to mean a material which may be a composition having a single component or a plurality of components, but which has generally homogenous properties both chemically and optically (for example a material based on several polymers, and/or based on polymer with organic or mineral additives).

A material in the sense of the invention also includes for example a matrix of a polymeric material or materials in which particles of a material with a different refractive index are encapsulated. These may consist of balls with a refractive index different from that of the matrix. It is considered that such a material is homogeneous if a sufficiently large scale is taken in relation to the size and density of the elements, or balls, as compared with their matrix. The index of such a material can be regarded as a refractive index which is averaged between the refractive indices of the ball type elements and the matrix.

Preferably, the difference in refractive index between the first and second materials is at least 3 or 4%, and in particular lies in the range between 5 and 15%. In absolute figures, this difference in refractive index is for example at least 0.08, and in particular it lies in the range between 0.09 and 0.13. This difference is in fact enough to obtain the required optical effect while enabling materials to be chosen which remain inexpensive and practical from the industrial point of view.

Preferably, the second material in the lens is an insert or a plurality of inserts, substituted for the first material locally in the lens. The term insert is to be understood to mean a material which will constitute the lens over its whole local thickness.

Preferably, the insert or inserts is or are disposed on a portion of the peripheral zone of the lens. If there are several inserts, then a regular distribution of the latter is preferably chosen over all or part of the peripheral zone of the lens. They may thus extend over a circumferential zone with an angular aperture of at least 15°, being for example in the range between 20 and 70° in a lens with a circular perimeter.

One example consists in choosing, for the first material of the lens, a glass or polymer based material, and for the second material, a polymer based material, especially one comprising polysulfone.

As mentioned above, the first or the second material can also be a material based on a matrix of one or more polymers, in which particles of a polymetric material having a different refractive index are encapsulated. In this way a lens having a single polymeric matrix can be envisaged, and particles having a different refractive index are distributed non-homogeneously in the matrix: there are then at least two zones, that is to say the zone which is rich in particles having a given mean refractive index, and the zone in which the particles are more scarce or absent, and with a refractive index close to or equal to that of the matrix by itself.

The choice of the second material also depends on the method of making the lens. Preferably, it is chosen to mould the second material in situ on the first material, but it is then necessary to make sure that the later in situ moulding step will not adversely affect the quality of forming of the first material. This is why it is preferable that the forming temperature of the first material be at least 50° C. greater than the forming temperature of the second material.

As regards the geometry of the lens, the choice of locally modifying its refractive index enables the distribution of light in the beam to be modified as desired without having to make any particular modification of its geometry: it is therefore possible to preserve the form of known lenses, and in particular the flat entry face and the convex exit face. The entry face of the lens can also, optionally, be locally concave in the zone or zones which are formed with an insert of a second material having a refractive index greater than that of the first material. The exit face, which may for example be convex, can thus be made without any significant surface discontinuity apart from an interface, which is virtually invisible to the naked eye, between the two materials of which the lens consists.

It goes without saying that the lens may have not two but three materials at least, having different refractive indices.

The invention further provides the optical module comprising a lens as discussed above, with, in particular, a configuration such that the insert or inserts are at the periphery and in the lower part of the lens under the working conditions of the module. The module preferably has a shield disposed between the reflector and the lens in order to produce at least one cut-off beam of the low beam or fog light type, with the insert or inserts of the lens enabling a part of the light rays emitted by the light source to be deflected towards a zone or zones above the cut-off line, and in particular in an overhead lighting direction.

BRIEF DESCRIPTION OF THE DRAWINGS

The invention will be described below with the aid of a non-limiting example which is shown in the following drawings:

FIG. 1*a* is a transverse cross section view of the lens according to an embodiment of the invention;

FIG. 1*b* is a front view of the lens according to an embodiment of the invention;

Figure 3:
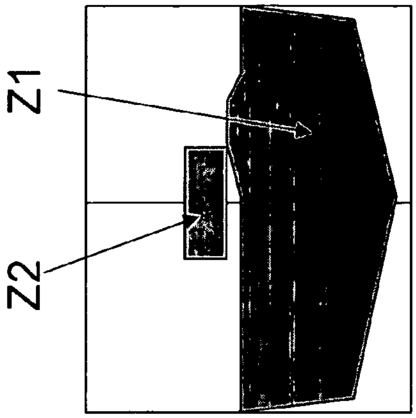
FIG. 3 is a simplified representation of the distribution of light in the light beam obtained with the optical module shown in FIG. 2.

All of the Figures are simplified in the interests of clarity, and do not necessarily show the actual scale between the various components shown therein.

DESCRIPTION OF THE PREFERRED EMBODIMENTS

FIG. 1 shows the lens L according to the invention in cross section. The geometry of the lens is conventional, with a flat entry face Fe and a convex exit face Fs. The terms entry and exit are to be understood as relating to the direction of the light rays which pass through them once the assembly is mounted in an optical headlamp module. The difference as compared with standard lenses is that this lens is made from two materials, namely:

- the material M1 which in the present case is glass having a refractive index of about 1518 and a melting point of about 500° C.; and
- material M2, which in the present case is a polysulfone based polymer having a refractive index of about 1643 and a melting point of about 200° C.

The material M1 is the predominant material in the lens L, and the material M2 is in the form of an insert I, which in the drawing of the lens is on its peripheral perimeter in the lower part. The two materials are separated by an interface line I, and their junction plane is a plane which is substantially always horizontal in accordance with the representation of the lens given in FIG. 1. It is possible to envisage a junction plane which is not horizontal, or which is not flat.

The association of the glass and the polysulfone is achieved by moulding in two steps, as follows. First the glass is moulded and then the polysulfone is moulded over the glass in a second step, such a method of manufacture being possible because the melting temperatures of the materials are very different from each other. The height hi of the insert is about 6 to 10 mm for a total height ht which is usually 60, 66 or 70 mm (these heights being measured on the entry face Fe of the lens L).

Figure 2:
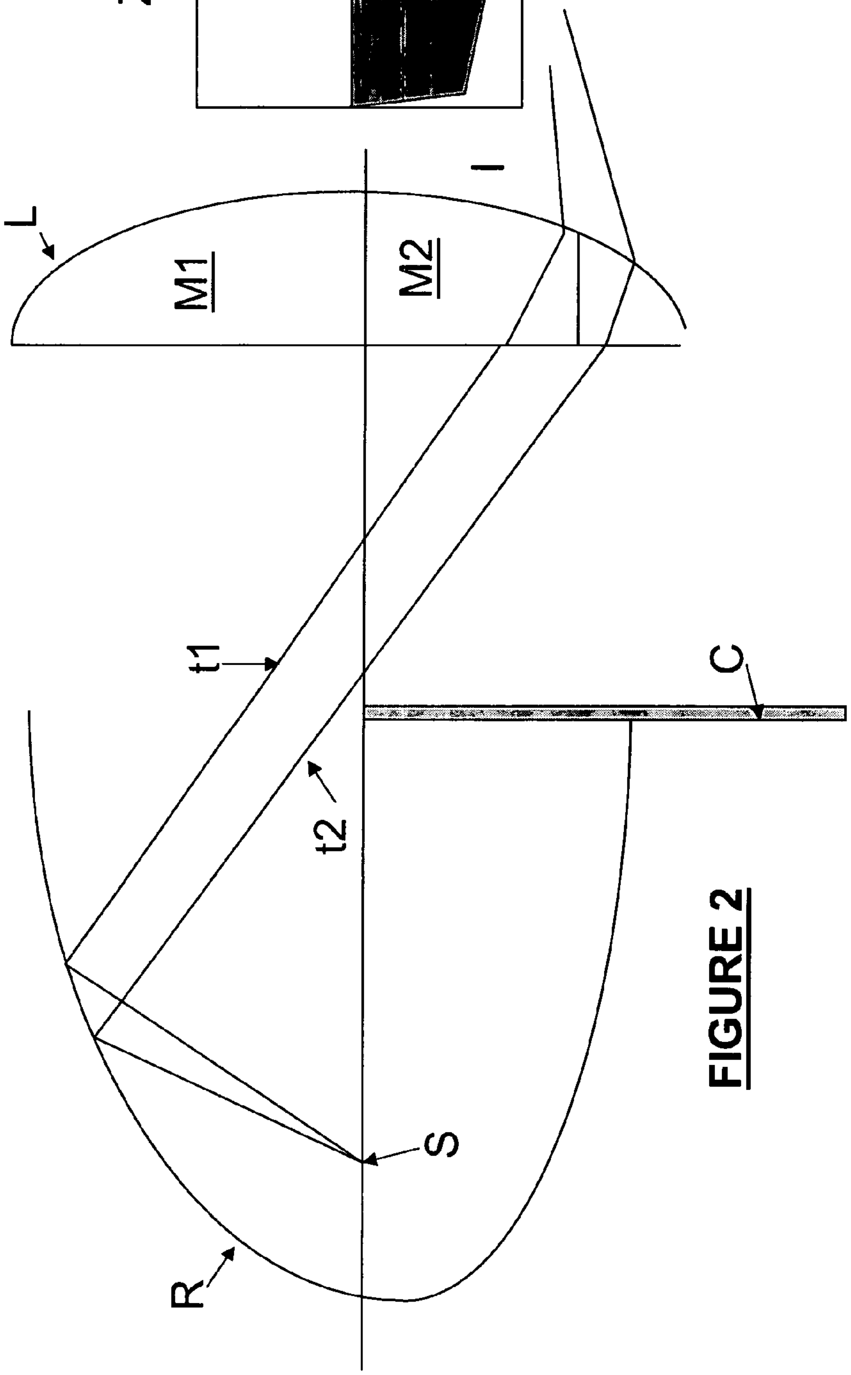
FIG. 2 is a cross section view taken on a vertical plane, of an optical module which incorporates the lens shown in FIGS. 1*a* and 1*b*.

FIG. 2 shows the integration of the lens L in an optical module of the elliptical type: in it, there can be seen the reflector R of an elliptical type, the light source S which is disposed at the base of the reflector (and which is a halogen lamp or xenon lamp); the shield C which is interposed between the reflector R and source S, and the lens L with its insert I located in the lower part as shown in FIG. 1. Two paths t1 and t2 of light rays emitted by the source S are shown very diagrammatically, as follows:

- the path t1 is that of a ray emitted by the source S, reflected by the reflector R, and then reaching the lens L in the zone which consists of the material M1, that is to say glass; and
- the path t2 is that of a similar type of light ray, but it reaches the lens in the zone consisting of the polysulfone insert.

It can be seen that the ray that follows the path t2 is deflected generally upwards by more than the ray following the path t1. It will be understood that the index between the glass and the polysulfone enables the deflection of the rays to be decided appropriately without the geometry of the lens as a whole having to be modified.

FIG. 3 shows, in an extremely simplified form, the distribution of a light ray which is obtained with the optical module shown in FIG. 2. It shows:

- a first zone Z1 which defines a cut-off beam of the low beam type for left hand drive, strongly illuminated, which consists essentially of rays passing through the lens in its glass part along a path of the t1 type,
- and a second zone Z2 with a much weaker illumination level, above the cut-off line, this consisting essentially of rays which pass through the lens at the level of its polysulfone insert I along a path of the t2 type.

This distribution, of the low beam type but also giving overhead lighting, conforms with current regulations, without the visual appearance of the lens in the module being significantly altered as compared with the standard all glass lens.

The method of making a lens of this kind is within the competence of a person skilled in this art. In particular, the in situ moulding of the insert or inserts can be performed by injecting the material M2 at the appropriate forming temperature at the level of the lens foot, an element which is not shown in FIG. 1, but which is a peripheral zone of the lens that is optically inactive and facilitates the fastening of the lens in the optical module. For example, the lens foot P shown in FIG. 1 is of the material M1, with injection points for the material M2 and with an appropriate form of the material M1 after its preliminary moulding step. Alternatively, it is also possible to arrange that the lens foot is made of a third material of a polymer type (for example filled polyetherpolysulfone), which will surround the material M2 during the step of moulding the insert in situ on the previously formed material M1.

The lens according to the invention has accordingly made it possible to reconcile optical performance and styling constraints. It is of course possible to give this type of lens other applications than the generation of a low beam with overhead lighting: it is possible to change the number of inserts, the choice of refractive indices, and the disposition of the said inserts in the lens, so as to alter as desired the amplitude of the deflection of the light rays incident on the said lens or part of a lens, for example in order to avoid having recourse to auxiliary mirrors for reflecting back, or other additional optical elements. It may find various applications too, outside the automotive field, in any apparatus which makes use of dioptric elements of the lens type.

What is claimed is:

1. A lens for an optical module, adapted to be mounted in a lighting apparatus for a motor vehicle, comprising:
- a first lens portion comprising a first material;
- a second lens portion comprising a second material, said first and second materials being distinct materials, a forming temperature of the first material being at least 50° C. greater than a forming temperature of the second material;
- a light entry face comprising a first light entry face portion and a second light entry face portion, said first light entry face portion corresponding to said first lens portion and having a substantially flat portion, said second light entry face portion corresponding to said second lens portion and having a concave portion; and
- a light exit face.

2. The lens according to claim 1, wherein the refractive index of the second material is greater than the refractive index of the first material.

3. The lens according to claim 1, wherein a difference in refractive index between the first material and the second material is at least 3%.

4. The lens according to claim 1, wherein a difference in refractive index between the first material and the second material is between 5 and 15%.

5. The lens according to claim 1, wherein a difference in refractive index between the first material and the second material is at least 0.08.

6. The lens according to claim 1, wherein the second portion is substituted for a portion of the first portion.

7. The lens according to claim 6, wherein the second portion is disposed on a portion of a peripheral zone of the lens.

8. The lens according to claim 1, wherein the first material is a glass based or polymer based material, and the second material is a polymer based material.

9. The lens according to claim 1, wherein the lens is formed by in situ moulding of the second portion on the previously formed first portion.

10. The lens according to claim 1, wherein the light exit face is substantially convex.

11. The lens according to claim 1, wherein the second portion is disposed in a lower and peripheral part of the lens.

12. The lens according to claim 8, wherein the second material is a polymer based material comprising polysulfone.

13. An optical module adapted to be mounted in a lighting apparatus for a motor vehicle, comprising:
- a reflector;
- at least one light source that emits light rays and is disposed in said reflector;
- a lens comprising a first lens portion including a first material having a first refractive index, a second lens portion including a second material having a second refractive index greater than said first refractive index, a light entry face, and a light exit face; and
- a shield positioned between the reflector and the lens,
- a first portion of the emitted light exits said first lens portion at the light exit face at a first angle and forms a cut-off beam, a second portion of the emitted light exits said second lens portion at the light exit face at a second angle greater than said first angle and projects above the cut-off beam.

14. A lens for an optical module, adapted to be mounted in a lighting apparatus for a motor vehicle, comprising:

a first lens portion comprising a first material;

a second lens portion comprising a second material, a difference in refractive index between the first material and the second material being between 0.09 and 0.13;

a light entry face comprising a first light entry face portion and a second light entry face portion, said first light entry face portion corresponding to said first lens portion and having a substantially flat portion, said second light entry face portion corresponding to said second lens portion and having a concave portion; and a light exit face.

15. A lens for an optical module, adapted to be mounted in a lighting apparatus for a motor vehicle, comprising:

a first lens portion comprising a first material;

a second lens portion comprising a second material having a reflective index different from a refractive index of said first material, at least of said first material and the second material comprises a polymer based matrix having particles disposed therein and the particles having a refractive index different from the matrix;

a light entry face comprising a first light entry face portion and a second light entry face portion, said first light entry face portion corresponding to said first lens portion and having a substantially flat portion, said second light entry face portion corresponding to said second lens portion and having a concave portion; and a light exit face.

16. A lens for an optical module, adapted to be mounted in a lighting apparatus for a motor vehicle, comprising:

a first lens portion comprising a first material;

a second lens portion comprising a second material, said first and second materials being distinct materials, said second portion comprises a plurality of second portions spaced apart at regular intervals over at least a part of a peripheral zone of the lens;

a light entry face comprising a first light entry face portion and a second light entry face portion, said first light entry face portion corresponding to said first lens portion and having a substantially flat portion, said second light entry face portion corresponding to said second lens portion and having a concave portion; and a light exit face.

* * * * *

UNITED STATES PATENT AND TRADEMARK OFFICE
CERTIFICATE OF CORRECTION

PATENT NO. : 7,583,451 B2
APPLICATION NO. : 11/385327
DATED : September 1, 2009
INVENTOR(S) : Casenave It is certified that error appears in the above-identified patent and that said Letters Patent is hereby corrected as shown below:

Column 7

Line 20 (claim 15), “reflective index” should read --refractive index--.

Signed and Sealed this

Ninth Day of February, 2010

David J. Kappos
*Director of the United States Patent and Trademark Office*